(12) United States Patent
Lancaster

(10) Patent No.: US 9,416,727 B2
(45) Date of Patent: Aug. 16, 2016

(54) ENGINE ASSEMBLY AND WASTE HEAT RECOVERY SYSTEM

(71) Applicant: Cummins Ltd., Huddersfield (GB)

(72) Inventor: Craig Robert Arthur Lancaster, West Yorkshire (GB)

(73) Assignee: CUMMINS LTD., Huddersfield (GB)

( * ) Notice: Subject to any disclaimer, the term of this patent is extended or adjusted under 35 U.S.C. 154(b) by 566 days.

(21) Appl. No.: 13/723,804

(22) Filed: Dec. 21, 2012

(65) Prior Publication Data

US 2013/0180242 A1 Jul. 18, 2013

(30) Foreign Application Priority Data

Dec. 22, 2011 (GB) .................................. 1122160.3

(51) Int. Cl.
*B60K 6/20* (2007.10)
*F02B 29/04* (2006.01)
(Continued)

(52) U.S. Cl.
CPC ............... *F02B 47/08* (2013.01); *F01D 25/164* (2013.01); *F01D 25/18* (2013.01); *F01D 25/22* (2013.01);
(Continued)

(58) Field of Classification Search
CPC ........... F01K 23/065; F02G 5/00; F02G 5/02; F02G 5/04; F02M 25/0707; F01N 5/02; F01N 5/04; F01N 2240/02; F02B 47/08; F02B 29/0443; F02B 29/0412; F02B 29/0406; Y02T 10/16; Y02T 10/163; Y02T 10/166
USPC ........ 60/605.3, 618, 616, 607–609, 597, 599, 60/320; 123/568.11, 568.12; 62/328.4, 62/323.1, 498, 402, 84; 417/407; 384/99

IPC ........................................................ F02C 7/36
See application file for complete search history.

(56) References Cited

U.S. PATENT DOCUMENTS 2,853,948 A * 9/1958 Aspelin .......................... 417/407
3,277,658 A * 10/1966 Leonard, Jr. ...................... 62/87
(Continued)

FOREIGN PATENT DOCUMENTS

DE 202007002602 U1 6/2007
DE 202007002602 U1 * 7/2007 .............. F01K 25/04
(Continued)

OTHER PUBLICATIONS

Van Buijtenen, J.P., The Tri-O-Gen Organic Rankine Cycle, Power Engineer, Mar. 2009, http://yeroc.us/d/orc_clearinghouse/papers/Tri-o-Gen_Toluene_ORC.
(Continued)

*Primary Examiner* — Thai Ba Trieu
(74) *Attorney, Agent, or Firm* — Taft Stettinius & Hollister LLP

(57) ABSTRACT

An engine assembly includes an internal combustion engine and a waste heat recovery system. The waste heat recovery system is configured to direct refrigerant around a loop. The loop includes a heat exchanger configured to transfer heat from engine exhaust gases to the refrigerant such that the refrigerant is vaporized; a turbine configured to receive and be driven by the vaporized refrigerant; and a condenser configured to cool and condense the refrigerant for subsequent delivery in liquid form to the heat exchanger. The turbine includes a turbine wheel connected to a shaft which is held in a shaft housing, a bearing lubricated by liquid refrigerant being provided between the shaft and the shaft housing, and squeeze film dampers which utilize the liquid refrigerant are provided between the bearing and the shaft housing.

18 Claims, 2 Drawing Sheets

(51) Int. Cl.
*F02G 3/00* (2006.01)
*F01K 23/10* (2006.01)
*F25B 43/02* (2006.01)
*F25B 27/00* (2006.01)
*F25B 1/00* (2006.01)
*F25D 9/00* (2006.01)
*F02B 47/08* (2006.01)
*F01K 23/06* (2006.01)
*F01D 25/18* (2006.01)
*F01K 25/08* (2006.01)
*F02G 5/02* (2006.01)
*F01M 1/12* (2006.01)
*F01D 25/22* (2006.01)
*F01D 25/16* (2006.01)
*F02C 1/08* (2006.01)
*F02C 6/12* (2006.01)
*F02C 6/18* (2006.01)
*F16C 27/04* (2006.01)
*F01N 5/02* (2006.01)
*F16C 33/66* (2006.01)

(52) U.S. Cl.
CPC ............... *F01K 23/065* (2013.01); *F01K 23/10* (2013.01); *F01K 25/08* (2013.01); *F01M 1/12* (2013.01); *F02C 1/08* (2013.01); *F02C 6/12* (2013.01); *F02C 6/18* (2013.01); *F02G 5/02* (2013.01); *F16C 27/045* (2013.01); *F01N 5/02* (2013.01); *F05D 2220/40* (2013.01); *F16C 33/6659* (2013.01); *Y02T 10/16* (2013.01); *Y02T 10/166* (2013.01)

(56) References Cited

U.S. PATENT DOCUMENTS

| | | | | |
|---|---|---|---|---|
| 3,367,125 | A * | 2/1968 | McGrath | 62/116 |
| 4,201,058 | A * | 5/1980 | Vaughan | 60/618 |
| 4,301,375 | A * | 11/1981 | Anderson | 60/641.7 |
| 4,361,015 | A * | 11/1982 | Apte | 62/238.4 |
| 5,044,167 | A | 9/1991 | Champagne | |
| 5,149,206 | A * | 9/1992 | Bobo | F16C 27/045 384/99 |
| 5,172,753 | A * | 12/1992 | Kadle et al. | 62/402 |
| 5,207,511 | A * | 5/1993 | Bobo | F16C 27/045 384/99 |
| 5,251,985 | A * | 10/1993 | Monzel | 384/99 |
| 5,344,239 | A * | 9/1994 | Stallone | F16C 27/045 384/99 |
| 5,449,235 | A * | 9/1995 | Buckmann | F16C 32/0651 384/108 |
| 5,471,965 | A * | 12/1995 | Kapich | 123/565 |
| 5,473,899 | A * | 12/1995 | Viteri et al. | 62/402 |
| 5,767,595 | A * | 6/1998 | Rosen | B60L 11/16 310/74 |
| 5,881,564 | A * | 3/1999 | Kishimoto | F04D 29/063 62/469 |
| 6,065,297 | A * | 5/2000 | Tischer | F04D 29/063 62/84 |
| 6,144,128 | A * | 11/2000 | Rosen | B60L 11/16 310/74 |
| 6,176,092 | B1 * | 1/2001 | Butterworth | F04D 29/063 62/84 |
| 6,279,340 | B1 * | 8/2001 | Butterworth | F04D 29/063 62/468 |
| 6,564,560 | B2 * | 5/2003 | Butterworth | F04D 29/063 62/84 |
| 7,404,299 | B2 * | 7/2008 | Drysdale et al. | 62/498 |
| 7,469,689 | B1 * | 12/2008 | Jones et al. | 123/559.1 |
| 7,625,121 | B2 * | 12/2009 | Pettinato | F16C 17/03 384/117 |
| 8,015,808 | B2 * | 9/2011 | Keefer et al. | 60/517 |
| 8,545,103 | B1 * | 10/2013 | Cooley | F16C 17/03 384/306 |
| 8,840,309 | B2 * | 9/2014 | Cooley | F16C 17/03 384/117 |
| 2002/0136473 | A1 * | 9/2002 | Mollmann | F16C 27/04 384/99 |
| 2007/0007771 | A1 | 1/2007 | Biddle et al. | |
| 2009/0277400 | A1 | 11/2009 | Conry | |
| 2011/0038717 | A1 * | 2/2011 | Lee et al. | 415/170.1 |
| 2011/0194960 | A1 * | 8/2011 | Wu | F04D 29/063 418/1 |
| 2011/0219812 | A1 * | 9/2011 | Kurihara et al. | 62/498 |
| 2011/0232324 | A1 * | 9/2011 | Kurihara | 62/498 |
| 2013/0056992 | A1 * | 3/2013 | Wada et al. | 62/323.1 |
| 2013/0239569 | A1 * | 9/2013 | Carter et al. | 60/608 |
| 2013/0263598 | A1 * | 10/2013 | Almbauer et al. | 60/645 |
| 2013/0263619 | A1 * | 10/2013 | Kapich | 62/238.4 |
| 2014/0341710 | A1 * | 11/2014 | Creamer | F04D 29/063 415/111 |
| 2014/0371919 | A1 * | 12/2014 | Creamer | F04D 29/063 417/423.8 |

FOREIGN PATENT DOCUMENTS

| | | | |
|---|---|---|---|
| EP | 1500804 A3 | 1/2005 | |
| GB | 1084356 | 9/1967 | |
| GB | 2405450 A | 2/2005 | |
| GB | 2427002 A | 12/2006 | |
| JP | 55043205 A * | 3/1980 | ............. F01K 23/10 |
| JP | 58220945 A * | 12/1983 | ............... F02G 5/04 |
| JP | 03011129 A * | 1/1991 | ............... F02C 7/36 |
| JP | 09088596 A | 3/1997 | |
| JP | 2005054779 A | 3/2005 | |
| JP | 2011058463 A * | 3/2011 | ............. F01D 25/18 |
| WO | 8202741 | 8/1982 | |
| WO | 9205342 | 4/1992 | |
| WO | 2007088194 A3 | 8/2007 | |
| WO | 2008126089 A2 | 10/2008 | |

OTHER PUBLICATIONS

United Kingdom Search Report, dated Apr. 24, 2012, pp. 1-2, United Kingdom Application No. GB1122160.3, United Kingdom Intellectual Property Office.

Zeidan, Fouad et al., Design and Application of Squeeze Film Dampers in Rotating Machinery, Proceedings of the 25th Turbomachinery Symposium, Sep. 17, 1996, pp. 169-188, Houston, Texas.

European Search Report, Jul. 24, 2014, pp. 1-8, European Patent Office, Germany.

* cited by examiner

ENGINE ASSEMBLY AND WASTE HEAT RECOVERY SYSTEM

BACKGROUND

The present invention relates to an engine assembly and to a waste heat recovery system.

The engine assembly may include an internal combustion engine which is provided with a turbocharger. Turbochargers are well known devices for supplying air to an inlet of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold. The turbocharger shaft is conventionally supported by journal and thrust bearings, including appropriate lubricating systems, located within a central bearing housing connected between the turbine and compressor wheel housings.

The turbine of a conventional turbocharger comprises: a turbine chamber within which the turbine wheel is mounted; an annular inlet defined between facing radial walls arranged around the turbine chamber; an inlet volute arranged around the annular inlet; and an outlet passageway extending from the turbine chamber. The passageways and chamber communicate such that pressurised exhaust gas admitted to the inlet volute flows through the inlet to the outlet passageway via the turbine and rotates the turbine wheel. It is also known to improve turbine performance by providing vanes, referred to as nozzle vanes, in the inlet so as to deflect gas flowing through the inlet. That is, gas flowing through the annular inlet flows through inlet passages (defined between adjacent vanes) which induce swirl in the gas flow, turning the flow direction towards the direction of rotation of the turbine wheel.

Turbines may be of a fixed or variable geometry type. Variable geometry turbines differ from fixed geometry turbines in that characteristics of the inlet (such as the inlet's size) can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the inlet using a variable geometry mechanism. Turbochargers provided with a variable geometry turbine are referred to as variable geometry turbochargers.

A waste heat recovery system may be arranged to recover heat from engine exhaust gases after they have passed through the turbine of a turbocharger (and may also be arranged to recover heat from exhaust gases which have not passed through a turbocharger). The waste heat recovery system may be arranged to convert the recovered heat into usable power. This may be done for example by converting the recovered heat into electricity, or may be done by converting the recovered heat into power which augments an output of an engine.

A conventional waste heat recovery system uses a refrigerant fluid which is pumped around a closed loop. A heat exchanger is used to transfer heat from exhaust gases to the refrigerant, which is initially in liquid form. This heat causes the refrigerant liquid to vaporise. The resulting refrigerant gas passes to a turbine and drives a turbine wheel of the turbine to rotate, thereby allowing usable power to be derived. The refrigerant gas passes from the turbine to a condenser which is configured to cool and condense the refrigerant so that it returns to liquid form. The refrigerant liquid is then passed to the heat exchanger, where the heat recovery cycle begins again.

The turbine wheel of the waste heat recovery system is mounted on a shaft which is held in a housing. A bearing is provided between the shaft and the housing, the bearings being configured to allow the shaft (and the turbine wheel) to rotate freely. Oil is delivered to the bearings through the housing, the oil acting to ensure that the bearings can move freely. A problem which may arise with this arrangement is that oil may pass from the bearings into the refrigerant fluid. This is undesirable because heat exchangers of the refrigerant fluid loop may be at high temperatures, and the oil may cause damage to the heat exchangers when it is heated to those high temperatures. In order to avoid such damage occurring it is conventional to include a separation apparatus which is configured to separate oil from the refrigerant fluid. However, such separation apparatus may be complex and expensive.

SUMMARY

It is an object of the present invention to provide an engine assembly and a waste heat recovery system which obviates or mitigates the above described disadvantages or other disadvantages present in the prior art.

According to a first aspect of the invention there is provided an engine assembly comprising an internal combustion engine and a waste heat recovery system, wherein the waste heat recovery system is configured to direct refrigerant around a loop which comprises a heat exchanger configured to transfer heat from engine exhaust gases to the refrigerant such that the refrigerant is vaporised, a turbine configured to receive and be driven by the vaporised refrigerant, and a condenser configured to cool and condense the refrigerant for subsequent delivery in liquid form to the heat exchanger, wherein the turbine comprises a turbine wheel connected to a shaft which is held in a shaft housing, a bearing lubricated by liquid refrigerant being provided between the shaft and the shaft housing, and wherein squeeze film dampers which utilise the liquid refrigerant are provided between the bearing and the shaft housing.

The engine assembly may include conduits configured to take the liquid refrigerant from the loop of the waste heat recovery system and return the refrigerant to the loop.

The squeeze film dampers may comprise annular protrusions which extend from the shaft housing towards the bearing, thereby defining gaps through which the liquid refrigerant may flow.

The squeeze film dampers may comprise annular protrusions which extend from the bearing towards the shaft housing, thereby defining gaps through which the liquid refrigerant may flow. Annular protrusions may extend from both the shaft housing and the bearing.

The gaps may have a radial size of 0.025 mm or greater.

The gaps may have a radial size of up to 0.2 mm.

Oil may be included in the loop of the waste heat recovery system in addition to refrigerant, the oil being less than 5% of the fluid present in the loop.

The oil may be less than 1% of the fluid present in the loop.

An output of the turbine may be connected to an output of the internal combustion engine.

An output of the turbine may be connected to an electricity generator.

O-rings may be provided between the bearing and the shaft housing. The O-rings may act as springs which centre the bearing within the shaft housing. The O-rings may act as anti-rotation devices which prevent rotation of an outer race of the bearing relative to the shaft housing.

The O-rings may be provided outboard of the squeeze-film dampers.

Additional O-rings may be provided between the bearing and the shaft housing, the O-rings being provided inboard of the shaft housing.

The engine assembly may further comprise a turbocharger which is configured to receive exhaust gases from the internal combustion engine and to direct output exhaust gases to a heat exchanger of the waster heat recovery system.

According to a second aspect of the invention there is provided a waste heat recovery system, wherein the waste heat recovery system is configured to direct refrigerant around a loop which comprises a heat exchanger configured to transfer heat from engine exhaust gases to the refrigerant such that the refrigerant is vaporised, a turbine configured to receive and be driven by the vaporised refrigerant, and a condenser configured to cool and condense the refrigerant for subsequent delivery in liquid form to the heat exchanger, wherein the turbine comprises a turbine wheel connected to a shaft which is held in a shaft housing, a bearing lubricated by liquid refrigerant being provided between the shaft and the shaft housing, and wherein squeeze film dampers which utilise the liquid refrigerant are provided between the bearing and the shaft housing.

According to a third aspect of the invention there is provided a method of recovering heat from exhaust gases received from an internal combustion engine, the method comprising using a heat exchanger to transfer heat from the exhaust gases to a liquid refrigerant such that the liquid refrigerant is vaporised, driving a turbine using the vaporised refrigerant, and cooling and condensing the refrigerant for subsequent delivery to the heat exchanger, wherein the turbine comprises a turbine wheel connected to a shaft which is held in a shaft housing, a bearing being provided between the shaft and the shaft housing, and squeeze film dampers being provided between the bearing and the shaft housing, wherein the method further comprises using the liquid refrigerant to lubricate the bearing and using the liquid refrigerant in the squeeze film dampers.

BRIEF DESCRIPTION OF THE FIGURES

Embodiments of the present invention will now be described, by way of example only, with reference to the accompanying Figures, in which.

DETAILED DESCRIPTION

Figure 1:
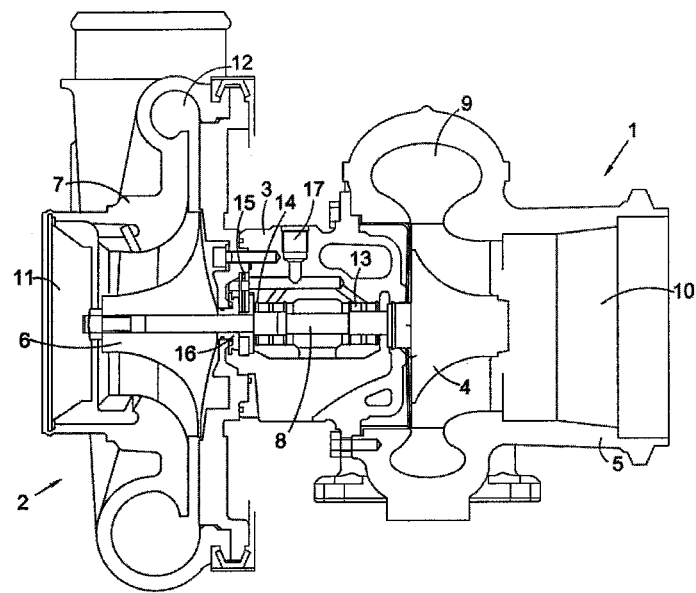
FIG. 1 is a cross-sectional view of a turbocharger which may form part of an engine assembly according to an embodiment of the invention.

Referring to FIG. 1, a turbocharger comprises a turbine 1 joined to a compressor 2 via a central bearing housing 3. The turbine 1 comprises a turbine wheel 4 for rotation within a turbine housing 5. Similarly, the compressor 2 comprises a compressor wheel 6 which can rotate within a compressor housing 7. The compressor housing 7 defines a compressor chamber within which the compressor wheel 6 can rotate. The turbine wheel 4 and compressor wheel 6 are mounted on opposite ends of a common turbocharger shaft 8 which extends through the central bearing housing 3.

The turbine housing 5 has an exhaust gas inlet volute 9 located annularly around the turbine wheel 4 and an axial exhaust gas outlet 10. The compressor housing 7 has an axial air intake passage 11 and a volute 12 arranged annularly around the compressor chamber. The volute 12 is in gas flow communication with a compressor outlet (not shown). The turbocharger shaft 8 rotates on journal bearings 13 and 14 housed towards the turbine end and compressor end respectively of the bearing housing 3. The compressor end bearing 14 further includes a thrust bearing 15 which interacts with an oil seal assembly including an oil slinger 16. Oil is supplied to the bearing housing from the oil system of the internal combustion engine via oil inlet 17 and is fed to the bearing assemblies by oil passageways.

In use, the turbine wheel 4 is rotated by the passage of exhaust gas from the annular exhaust gas inlet 9 to the exhaust gas outlet 10. The turbine wheel 4 in turn rotates the compressor wheel 6 which thereby draws intake air through the compressor inlet 11 and delivers boost air to the intake of an internal combustion engine 20 (see FIG. 2) via the volute 12 and then the outlet.

The turbocharger shown in and described with reference to FIG. 1 may form part of an engine assembly shown in schematically in FIG. 2. The engine assembly comprises an internal combustion engine 20, a turbocharger and a waste heat recovery system 22. The internal combustion engine 20 may for example be a diesel engine or may be a petrol (gasoline) engine.

The compressor 2 of the turbocharger is arranged to draw in air (represented by a dashed arrow) and to push out air at high pressure (represented by a second dashed arrow). An outlet of the compressor 2 is connected to a charge air cooler 24 which is in turn connected to an intake manifold 26 of the internal combustion engine 20 (the passage of the compressed air is represented by dashed arrows). The charge air cooler 24 is a heat exchanger which is configured to transfer heat from the compressed air to ambient air, the ambient air being drawn through the charge air cooler by a mechanical fan 28. The charge air cooler 24 cools the compressed air, thereby increasing its density, before the compressed air is delivered to the intake manifold 26.

Exhaust gases from the internal combustion engine 20 pass out of an exhaust manifold 28. An outlet from the exhaust manifold 28 is connected to the turbine 1, and an outlet from the exhaust manifold is connected to a heat exchanger 32.

Exhaust gas which passes to the turbine 1 drives the turbine to rotate. Rotation of the turbine 1 causes rotation of the compressor 2 via the shaft 8. The compressor draws in air and compresses it for delivery to the intake manifold 26, as explained above. An outlet from the turbine 1 is connected to an after-treatment system 34 which applies an after-treatment to the exhaust gas. The after-treatment may for example be removal of particulates and/or nitrous oxide from the exhaust gas. The after-treatment system 34 is connected to an exhaust gas control valve 36. The exhaust gas control valve 36 has a first output connection which is directly connected to an exhaust 39 and has a second output connection which is connected to the exhaust via a heat exchanger 38. The heat exchanger 38 is hereafter referred to as the turbine exhaust gas boiler 38. The exhaust gas control valve 36 may be used to direct some or all of the exhaust gas through the turbine exhaust gas boiler 38. The turbine exhaust gas boiler 38 transfers heat from the exhaust gas to a refrigerant liquid of the waste heat recovery system, and may heat the refrigerant liquid to a temperature which is at or close to the boiling point of the refrigerant liquid.

As mentioned above, exhaust gas which does not pass to the turbine 1 passes to the heat exchanger 32. This heat exchanger 32 is hereafter referred to as the superheater 32. In the superheater 32 heat is transferred from the exhaust gas to the refrigerant fluid of the waste heat recovery system. This may increase the temperature of the refrigerant fluid to a temperature which is above the boiling point of the refrigerant.

The exhaust gas then passes from the superheater 32 into another heat exchanger 40. This heat exchanger 40 is hereafter referred to as the engine exhaust gas boiler 40. In the engine exhaust gas boiler 40 heat is transferred from the exhaust gas to the refrigerant fluid of the waste heat recovery system. The refrigerant fluid will have a lower temperature in the engine exhaust gas boiler 40 than in the superheater 32. The refrigerant fluid may be heated in the engine exhaust gas boiler 40 to a temperature which is at or close to the boiling point of the refrigerant liquid.

The exhaust gas passes from the engine exhaust gas boiler 40 to a control valve 42, which is hereafter referred to as the exhaust gas recirculation valve 42. When the exhaust gas recirculation valve 42 is open, exhaust gas passes via the exhaust gas recirculation valve to the intake manifold 26 of the internal combustion engine 20. When the exhaust gas recirculation valve 42 is closed, exhaust gas is not passed to the intake manifold 26 (the circulation of exhaust gas through the superheater 32 and engine exhaust gas boiler 40 is prevented).

Heat which is extracted from the exhaust gas via the superheater 32, the turbine exhaust gas boiler 38 and the engine exhaust gas boiler 40 is transferred to the refrigerant fluid. The waste heat recovery system 22 derives usable power from the refrigerant fluid. The waste heat recovery system 22 is a closed loop system, conduits of the closed loop being indicated by solid arrows in FIG. 2. The closed loop system may be considered to exclude conduits 58, 60, which are discussed further below. The refrigerant fluid of the closed loop system undergoes a phase transition from liquid to gaseous form at operating temperatures of the waste heat recovery system, as is explained further below.

The waste heat recovery system 22 is a Rankine cycle system. The closed loop of the waste heat recovery system 22 may be considered to begin at a condenser cooler 44. Refrigerant fluid is cooled in the condenser cooler 44 by ambient air which is drawn through the condenser cooler by the mechanical fan 28. The refrigerant fluid, which enters the condenser cooler 44 in gaseous form is thereby condensed to liquid form. The refrigerant liquid is pumped from the condenser cooler 44 by a pump 46 and passes to a recuperator 48. The function of the recuperator 48 is described further below. The refrigerant liquid then passes via a control valve 50 to either or both of the turbine exhaust gas boiler 38 or the engine exhaust gas boiler 40. Refrigerant liquid which passes to the turbine exhaust gas boiler 38 is heated by the exhaust gas in the exhaust gas boiler and is then passed to the engine exhaust gas boiler 40. The refrigerant fluid is heated further in the engine exhaust gas boiler 40 by exhaust gas. Refrigerant liquid which is passed directly to the engine exhaust gas boiler 40 by the control valve 50 is also heated by exhaust gas. The refrigerant passes from the engine exhaust gas boiler 40 to the superheater 32 where it is heated further by exhaust gas. The cumulative effect of this heating of the refrigerant is to cause the refrigerant to vaporise to a gas which is heated to a high temperature, for example between around 200° C. and around 250° C. The heated refrigerant gas is passed via a conduit to a turbine 52 of the waste heat recovery system 22. The turbine is an expansion turbine, meaning that the refrigerant gas is expanded through the turbine. The gas drives a turbine wheel of the turbine 52 to rotate, thereby allowing usable power to be obtained (as explained further below).

The refrigerant gas passes from an outlet of the turbine 52 to the recuperator 48. The recuperator 48 is a form of heat exchanger, heat being transferred in the recuperator from the heated refrigerant gas to refrigerant liquid which is being pumped by the pump 46 to the control valve 50. The temperature of the refrigerant gas is thus reduced, although the refrigerant remains in a gaseous form. The pump 46 draws the refrigerant gas from the recuperator 48 to the condenser cooler 44, where it is condensed to liquid form. The pump 46 then once again pumps the liquid refrigerant to the recuperator 48.

The turbine exhaust gas boiler 38, engine exhaust gas boiler 40, and superheater 32 are all examples of heat exchangers. In alternative configurations the waste heat recovery system may comprise one or more heat exchangers which may be provided at any suitable location(s).

A shaft 54 extends from the turbine 52. The shaft 54 is connected to the turbine wheel of the turbine 52 and thus rotates with the turbine wheel. Usable power may be derived from the shaft 54 in a variety of different ways. For example, the shaft 54 may be connected to an output of the internal combustion engine 20, thereby augmenting the power output from the internal combustion engine. This transfer of power is indicated schematically in FIG. 2 by hollow arrows. Mechanical gearing 56 may be located between the shaft 54 and the output of the internal combustion engine 20. The mechanical gearing 56 may be configured to reduce the speed of shaft rotation to a speed which corresponds with the speed of rotation of the output of the internal combustion engine 20.

In alternative example, the shaft 54 may be connected to an electricity generator. For example the shaft 54 may be connected to a rotor of an electric generator 55 which generates electricity when the shaft 54 is driven to rotate by the turbine 52. In general, the shaft 54 may be connected to any suitable load, which may for example be electrical, mechanical or hydraulic.

A portion of the refrigerant liquid passes out of the closed loop of the waste heat recovery system 22 via an input conduit 58 to the turbine 52. This refrigerant liquid is used to lubricate a bearing of the turbine 52. The pump 46 promotes flow of the refrigerant liquid to the turbine 52. An output conduit 60 returns refrigerant fluid which has been collected from the bearing to the closed loop. The output conduit 60 is configured to return the refrigerant fluid to the condenser cooler 44. In an alternative arrangement the output conduit 60 may be configured to return the refrigerant fluid to the closed loop downstream of the condenser cooler 44, for example with a cooler being provided in the output conduit to cool the refrigerant fluid before it is returned to the closed loop.

Figure 2:
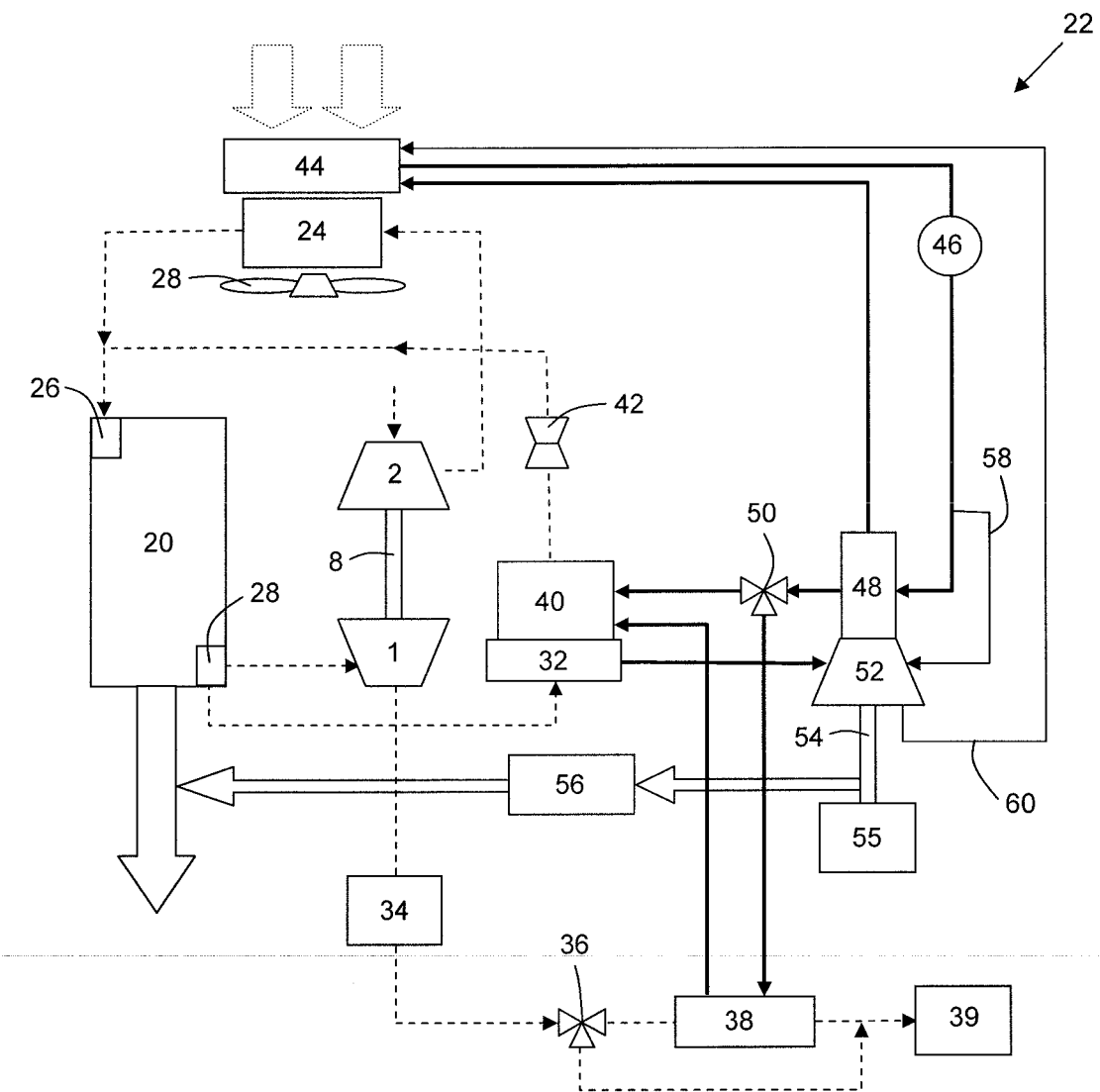
FIG. 2 schematically depicts an engine assembly according to an embodiment of the invention.

Although a particular waste heat recovery system 22 is shown in FIG. 2, embodiments of the invention may comprise other waste heat recovery systems (e.g. other waste heat recovery systems which use the Rankine cycle).

In an embodiment, high pressure air which is pushed out of the compressor 2 may be passed through a heat exchanger (not shown) which forms part of the closed loop of the waste heat recovery system 22. The heat exchanger may be used to transfer heat from the high pressure air (which has been heated by the action of the compressor 2) to the refrigerant.

The heat may be combined with heat transferred to the refrigerant from the exhaust gas, the heated refrigerant being used to drive the turbine 52.

In an embodiment, the waste heat recovery system 22 may allow exhaust gas passing out of the turbocharger to pass into the atmosphere without recovering heat from it. In this embodiment heat may be recovered from exhaust gas which is being recirculated to the intake manifold 26. Heat may also be recovered from high pressure air which is pushed out of the compressor (in the manner explained above).

Figure 3:
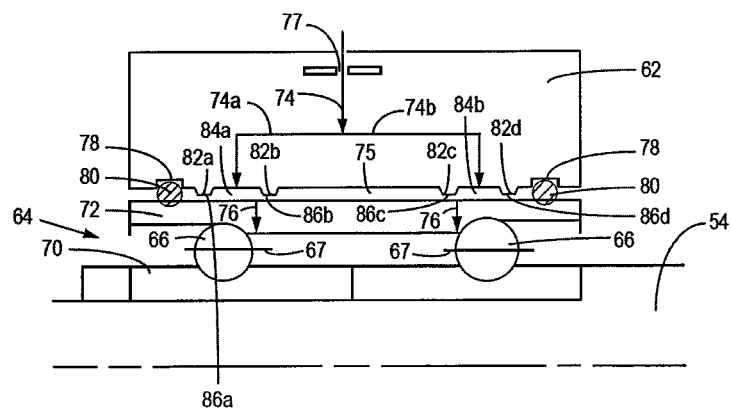
FIG. 3 schematically depicts a turbine shaft and bearing assembly which form part of a turbine of a waste heat recovery system of the engine assembly of FIG. 2.

FIG. 3 shows schematically in cross-section part of the shaft 54 of the waste heat recovery system turbine 52 shown in FIG. 2. The shaft 54 is connected to a turbine wheel (not shown) which is driven to rotate by heated refrigerant gas (as described above in connection with FIG. 2). The shaft 54 is held in a shaft housing 62, part of which is shown in FIG. 3. The shaft housing 62 has a generally cylindrical inner surface and extends around the shaft 54. For ease of illustration only part of the shaft housing 62 is shown in FIG. 3. A bearing 64 is located between the shaft 54 and the shaft housing 62 to allow the shaft to rotate freely within the shaft housing. The bearing 64 has a generally annular shape and extends around the shaft 54, but for ease of illustration only part of the bearing 64 is shown in FIG. 3. The bearing comprises balls 66 which are held between an inner race 70 and an outer race 72. The inner race 70 is secured to the shaft 54, and the outer race 72 is held within the shaft housing 62.

Cages 67 hold the balls 66 in position around the inner race 70. Each cage 67 comprises a ring which is provided with a series of holes, a ball 66 being provided in each hole. The cages 67 may be plastic or metal. The holes in the cages 67 ensure that the balls 66 remain spaced apart around the inner race 70. The holes are sufficiently large to allow the balls to rotate freely within the holes.

The shaft housing 62 is provided with a conduit 74 which is arranged to deliver refrigerant liquid from the input conduit 58 (see FIG. 2). An orifice 77 or other pressure and/or flow limiting device controls the flow of refrigerant liquid through the conduit 74. The conduit 74 branches into two conduits 74a, 74b which have outlets at an inner surface of the shaft housing 62. The conduits 74a, 74b deliver refrigerant liquid into a space 75 between the shaft housing 62 and the outer race 72 of the bearing 64. The outer race 72 of the bearing is provided with conduits 76 which are connected to an interior space of the bearing 64 where the balls 66 are located. The conduits 76 thus pass refrigerant liquid to the interior space of the bearing 64 and to the balls 66. The refrigerant liquid provides lubrication of the balls 66 at locations at which the balls come into contact with the inner and outer races 70, 72, thereby allowing the shaft 54 to rotate at high speeds (e.g. up to around 100,000 rpm). Refrigerant liquid which passes out of the bearing 64 is collected in a drain (not shown) and is delivered to the output conduit 60 (see FIG. 2).

Annular recesses 78 are provided in the shaft housing at locations which are adjacent to either end of the outer race 72 of the bearing 64. Each annular recess 78 holds an O-ring 80 which provides a seal between the shaft housing 62 and the outer race 72. The O-rings 80 thereby define outer ends of the space 75 between the shaft housing 62 and the outer race 72. The O-rings 80 act as springs which centre the bearing 64 within the shaft housing 62. In addition, the O-rings 80 act as anti-rotation devices which prevent the outer race 72 from rotating relative to the shaft housing 62.

Refrigerant liquid may move between different locations within the space 75 between the shaft housing 62 and the outer race 72. However, movement of the refrigerant liquid within the space 75 is limited by annular protrusions 82a-d which extend radially inwardly from the shaft housing. Each annular protrusion 82a-d may for example have an axial length of 1 mm or more (where 'axial' is intended to mean a direction parallel to a rotational axis of the shaft 54). Each annular protrusion 82a-d may for example have an axial length of up to 10 mm. Different annular protrusions 82a-d may have different lengths or may have the same length. Each pair of annular protrusions 82a,b, 82c,d is located either side of a branch 74a, 74b of the refrigerant liquid carrying conduit 74, so that refrigerant liquid passes into an annular space 84a,b between the annular protrusions 82a,b, 82c,d. The annular protrusions 82a-d are located inboard of the O-rings 80 (i.e. axially closer to a central point of the bearing than the O-rings). The annular protrusions 82a-d are separated from the outer race 72 by gaps 86a-d. The gaps 86a-d allow refrigerant liquid to pass from the annular space 84a,b between the annular protrusions 82a,b into other parts of the space 75 between the shaft housing 62 and the outer race 72. This passage of the refrigerant liquid is restricted by the size of the gaps 86a-d, and passage of the refrigerant liquid through the gaps damps vibrations of the shaft 54 and the bearing 64. The annular protrusions 82a-d and gaps 86a-d thus act as squeeze film dampers which stabilise the shaft 54 when it is rotating. A first pair of annular protrusions 82a,b and gaps 86a,b form a first squeeze film damper, and a second pair of annular protrusions 82c,d and gaps 86c,d form a second squeeze film damper.

The gap 86a-d between each annular protrusion 82a-d and the outer race 72 may have a predetermined size. The gap 86a-d may be the same size for each annular protrusion 82a-d, or may be different for one or more annular protrusions. The radial size of the gap may for example be 0.025 mm or greater. The radial size of the gap may for example be up to 0.2 mm. In general, a smaller gap 86a-d may be provided when the protrusion 82a-d has a shorter axial length, and a bigger gap may be provided when the protrusion has a longer axial length. In this context a smaller gap may be considered to be a gap which is closer to 0.025 mm than to 0.2 mm (and vice versa for a bigger gap), and a shorter axial length may be considered to be an axial length which is closer to 1 mm than to 10 mm (and vice versa for a longer axial length). The term 'radial size' is intended to mean the size in a direction which is radial relative to the axis of rotation of the shaft 54.

The selection of the size of the gap 86a-d and the length of the annular protrusions 82a-d may depend in part upon the viscosity of the refrigerant liquid. A refrigerant with a lower viscosity will exert lower pressures and forces, and thus may for example be used in combination with a smaller gap (which may have a shorter axial length). A refrigerant with a higher viscosity will exert higher pressures and forces, and thus may for example be used in combination with a larger gap (which may have a longer axial length).

Rotor system analysis which takes into account properties of the turbine wheel of the turbine 52, the shaft 54, the bearing 64, and the squeeze film dampers, may be used to determine an optimum combination of gap size and axial length. The rotor system analysis may for example be performed using DyRoBeS software, which is available from Eigen Technologies, Inc. of North Carolina, USA.

Each squeeze film damper formed by the annular protrusions 82a-d and gaps 86a-d may overlap in a radial direction with balls 66 of the bearing 64.

Although a particular form of squeeze film damper is shown in FIG. 3, the squeeze film dampers may be provided in any suitable form.

The shaft 54 may be formed from stainless steel, or any other suitable material. The inner and outer races 70, 72 may be formed from stainless steel, 100Cr6 steel, or any other suitable material. The balls 66 may be formed from any suitable material. The shaft housing 62 may be cast stainless steel, or any other suitable material.

In an embodiment in which the turbine 52 is connected via gearing 56 to the internal combustion engine 20 (see FIG. 2), the turbine will be required to rotate at a variety of different speeds because the engine will operate at different speeds (for example if the engine assembly is used to power a truck or other vehicle). The turbine 52 may for example be required to rotate at speeds which range from 20,000 rpm to 70,000 rpm, and which may be as high as 100,000 rpm. It is likely that the range of rotation speeds over which the turbine 52 operates will include resonant frequencies of the turbine. Stabilising the shaft 54 of the turbine 52 using squeeze film dampers reduces shaft vibration which may occur when the shaft rotates at a resonant speed (the vibrations are damped by the squeeze film dampers). The turbine 52 is likely to often pass through resonant frequencies because the speed of the internal combustion engine will change frequently during use. By reducing shaft vibration when the turbine passes through a resonant frequency, the squeeze film dampers may provide a significant increase of the life of the bearing 64.

Because refrigerant liquid is used lubricate the bearing 64 and is used by the squeeze film dampers, it is not necessary to use oil in the bearing or squeeze film dampers. This is advantageous because it avoids the possibility that oil may leak from the bearing or squeeze film dampers into the closed loop of the waste heat recovery system. In a conventional waste heat recovery system the waste heat recovery turbine is lubricated using oil, and leakage of oil into the closed loop of the waste heat recovery system may cause damage to heat exchangers or other components of the waste heat recovery system. In a conventional system this potential damage is avoided by including in the assembly a separator which is arranged to separate oil from the refrigerant fluid. However, the separator adds to the complexity of the assembly and makes it more expensive to produce. Embodiments of the invention do not require a separator because oil is not used to lubricate the bearing of the waste heat recovery turbine. The complexity and expense of the waste heat recovery system is therefore reduced.

The refrigerant fluid may for example be R245fa (Genetron) available from Honeywell of New Jersey, USA. The refrigerant fluid may for example be Toluene. Other suitable refrigerant fluids may be used.

In addition to lubricating the bearing 64, the refrigerant liquid may also cool the shaft 54. Heat is transferred to the refrigerant liquid when the refrigerant liquid is in the bearing 64 or in the space 75 between the outer race 72 and the shaft housing 6. This heat is carried away from the shaft 54 when the refrigerant liquid passes to a refrigerant drain. Cooling the shaft provides some cooling of the turbine wheel, since the turbine wheel is in thermal communication with the shaft 54.

In the embodiment shown in FIG. 3 the annular protrusions 82a-d extend from the shaft housing 62 towards the outer race 72. However, in an alternative embodiment annular protrusions may instead extend from the outer race towards the housing. In a further alternative embodiment annular protrusions may extend from both the shaft housing and the outer race. In general, any suitable configuration may be used to restrict flow of the refrigerant liquid and thereby provide squeeze film damping.

In this document references to the outer race 72 may be interpreted as encompassing a housing, cage, or other apparatus which may form an outer surface of the bearing 64.

References to the shaft housing 62 may be interpreted as encompassing an insert or other apparatus to which the outer race 72 is connected.

Some oil may be included with the refrigerant liquid. Where this is the case, the oil may be provided as a sufficiently small fraction of the liquid in the waste heat recovery system 22 that it does not have a significant impact upon the waste heat recovery cycle itself (the oil does not contribute to the waste heat recovery cycle because it does not undergo a phase transition). It may be desirable to provide the oil as a sufficiently small fraction of the liquid in the waste heat recovery system that it mixes with the refrigerant and doesn't, for example, coalesce into pools within the waste heat recovery system. For example the fluid in the waste heat recovery system may comprise up to 5% oil, with the remaining fluid being refrigerant. For example, the fluid in the waste heat recovery system may comprise up to 1% oil, with the remaining fluid being refrigerant. The oil may be an oil which is suitable for use at the temperatures which occur in the waste heat recovery system (i.e. will not be damaged at those temperatures). The oil may for example be heated up to around 250° C. The oil may for example be a polyolester oil.

In the embodiment shown in FIG. 3, O-rings 80 are provided outboard of the squeeze film dampers (i.e. axially further from a central point of the bearing 64 than the squeeze film dampers). Additional O-rings (not shown) may be provided inboard of the squeeze film dampers (i.e. axially closer to a central point of the bearing than the squeeze film dampers). An advantage provided by these additional O-rings is that the space which is filled with refrigerant liquid is reduced, thereby reducing the amount of refrigerant liquid that is required.

In an embodiment, no O-rings are provided. Where this is the case, any other suitable sealing apparatus may be used to provide a seal between the outer race 72 and the shaft housing 62. Any other suitable apparatus may be used to centre the bearing 64 within the shaft housing 62. Any other suitable apparatus may be used to prevent rotation of the outer race 72 within the shaft housing 62.

Parts of the turbine 52 which are not shown in FIG. 3 may be of conventional construction. For example, the turbine 52 may comprise a turbine chamber within which a turbine wheel is mounted (the turbine wheel being connected to the shaft 54), an annular inlet defined between facing radial walls arranged around the turbine chamber, an inlet volute arranged around the annular inlet, and an outlet passageway extending from the turbine chamber.

In the context of the invention, the term 'refrigerant' may be interpreted as meaning a fluid which will undergo a phase transition from liquid to gaseous form in a heat exchanger of the waste heat recovery system (at a normal operating temperature of the heat exchanger), and which will undergo a phase transition from gaseous form to liquid form in a condenser of the waste heat recovery system.

The engine assembly may be used to power a truck or some other vehicle. In applications such as this the turbine 52 may be connected via gearing 56 to an output of the internal combustion engine 20 (which may for example be a diesel engine). Alternatively, the engine assembly may be used in a static environment, for example to generate electricity.

The invention claimed is:

1. An engine assembly comprising an internal combustion engine connected to a waste heat recovery system, wherein the waste heat recovery system is configured to direct refrigerant around a loop which comprises:

a heat exchanger connected to an exhaust outlet of the internal combustion engine and configured to transfer heat from engine exhaust gases to the refrigerant such that the refrigerant is vaporised;

a turbine configured to receive and be driven by the vaporised refrigerant; and a condenser configured to cool and condense the refrigerant for subsequent delivery in liquid form to the heat exchanger;

wherein:
the turbine comprises a turbine wheel connected to a shaft which is held in a shaft housing, a bearing lubricated by liquid refrigerant being provided between the shaft and the shaft housing, and wherein squeeze film dampers which utilise the liquid refrigerant are provided between the bearing and the shaft housing, the squeeze film dampers comprise annular protrusions which extend front the shaft housing towards the bearing, thereby defining gaps which act as passages for the liquid, and the gaps have a radial size of from at least 0.025 mm up to 0.2 mm.

2. The engine assembly of claim 1, wherein the engine assembly includes conduits configured to take the liquid refrigerant from the loop of the waste heat recovery system and return the refrigerant to the loop.

3. The engine assembly of claim 1, wherein oil is included in the loop of the waste heat recovery system in addition to refrigerant, the oil being less than 5% of a fluid present in the loop, and the refrigerant provides a remaining portion of the fluid present in the loop.

4. The engine assembly of claim 3, wherein the oil is less than 1% of the fluid present in the loop.

5. The engine assembly of claim 1, wherein an output of the turbine is connected via gearing to an output of the internal combustion engine.

6. The engine assembly of claim 1, wherein an output of the turbine is connected to an electricity generator.

7. An engine assembly comprising an internal combustion engine connected to a waste heat recovery system, wherein the waste heat recovery system is configured to direct refrigerant around a loop winch comprises:

a heat exchanger connected to an exhaust outlet of the internal combustion engine and configured to transfer heat from engine exhaust gases to the refrigerant such that the refrigerant is vaporized;

a turbine configured to receive and be driven by the vaporised refrigerant; and a condenser configured to cool and condense the refrigerant for subsequent delivery in liquid form to the heat exchanger;

wherein:
the turbine comprises a turbine wheel connected to a shaft which is held in a shaft housing, a hearing lubricated by liquid refrigerant being provided between the shaft and the shaft housing, and wherein squeeze film dampers which utilise the liquid refrigerant are provided between the bearing and the shaft housing, the squeeze film dampers comprise at least one of annular spaces and annular recesses positioned between two of annular protrusions which extend from the bearing towards the shaft housing, thereby definite saps which act as passages for the liquid refrigerant, and the gaps have a radial size of from at least 0.025 mm up to 0.2 mm.

8. The engine assembly of claim 7, wherein the engine assembly includes conduits configured to take the liquid refrigerant from the loop of the waste heat recovery system and return the refrigerant to the loop.

9. The engine assembly of claim 7, wherein oil Is included in the loop of the waste heat recovery system in addition to refrigerant, the oil being less than 5% of a fluid present in the loop, and the refrigerant provides a remaining portion of the fluid present in the loop.

10. The engine assembly of claim 9, wherein the oil is less than 1% of the fluid present in the loop.

11. The engine assembly of claim 7, wherein an output of the turbine is connected via gearing to an output of the internal combustion engine.

12. The engine assembly of claim 7, wherein an output of the turbine is connected to an electricity generator.

13. An engine assembly comprising an internal combustion engine connected to a waste heat recovery system, wherein the waste heat recovery system is configured to direct refrigerant around a loop which comprises:

a heat exchanger connected to an exhaust outlet of the internal combustion engine and configured to transfer heat from engine exhaust gases to the refrigerant such that the refrigerant is vaporised;

a turbine configured to receive and be driven by the vaporised refrigerant; and a condenser configured to cool and condense the refrigerant for subsequent delivery in liquid form to the heat exchanger;

wherein
the turbine comprises a turbine wheel connected to a shaft which is held in a shaft housing, a bearing lubricated by liquid refrigerant being provided between the shaft and the shaft housing, and wherein squeeze film dumpers which utilise the liquid refrigerant are provided between the bearing and the shall housing, O-rings are provided between the hearing and the shaft housing, and the O-rings are provided outboard of the squeeze-film dampers.

14. The engine assembly of claim 13, wherein additional O-rings are provided between the bearing and the shaft housing, the O-rings being provided inboard of the shaft housing.

15. The engine assembly comprising an internal combustion engine connected to a waste heat recovery system, wherein the waste heat recovery system is configured to direct refrigerant around a loop which comprises:

a heat exchanger connected to an exhaust outlet of the internal combustion engine and configured lo transfer heat from engines exhaust gases to the refrigerant such that the refrigerant is vaporized;

a turbine configured to receive and be driven by the vaporised refrigerant; and a condenser configured to cool and condense the refrigerant for subsequent delivery in liquid form to the heat exchanger;

wherein
the turbine comprises a turbine wheel connected to a shaft which is held in a shaft housing, a hearing lubricated by liquid refrigerant being provided between the shaft and the shaft housing, and wherein squeeze film dampers which utilise the liquid refrigerant are provided between the bearing and the shaft housing and the engine assembly further comprises a turbocharger which is connected to the exhaust outlet of the internal combustion engine and configured to receive exhaust gases from the internal combustion engine and to direct output exhaust gases to a heat exchanger of the waste heat recovery system.

16. The engine assembly of claim 15, wherein oil is included in the loop of the waste heat recovery system in addition to refrigerant, the oil being less than 5%-of a fluid present in the loop, and the refrigerant provides a remaining portion of the fluid present in the loop.

17. The engine assembly of claim 16, wherein the oil is less than 1% of the fluid present in the loop.

18. The engine assembly of claim 15, wherein an output of the turbine is connected to an electricity generator.

* * * * *